(12) United States Patent
Marks

(10) Patent No.: US 8,798,445 B2
(45) Date of Patent: Aug. 5, 2014

(54) ENHANCED BANNER ADVERTISEMENTS

(75) Inventor: Bradley Michael Marks, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 243 days.

(21) Appl. No.: 12/713,951

(22) Filed: Feb. 26, 2010

(65) Prior Publication Data

US 2011/0211813 A1    Sep. 1, 2011

(51) Int. Cl.

| H04N 5/76 | (2006.01) |
|---|---|
| H04N 5/92 | (2006.01) |
| H04N 5/445 | (2011.01) |
| H04N 9/80 | (2006.01) |
| G06F 17/30 | (2006.01) |
| G09B 1/08 | (2006.01) |

(52) U.S. Cl.
USPC ........... 386/299; 386/240; 386/244; 386/248; 386/297; 340/539.13; 707/736; 725/58

(58) Field of Classification Search
USPC ........... 386/297, 240, 244, 248, 299, E5.043; 340/539.13; 348/E5.099, E5.103, 348/E5.105, E7.071; 455/556.2; 707/736; 707/E17.044; 709/208, 217; 717/764; 725/58; 700/83
See application file for complete search history.

(56) References Cited

U.S. PATENT DOCUMENTS

| 5,790,974 | A | 8/1998 | Tognazzini |
|---|---|---|---|
| 6,732,080 | B1 | 5/2004 | Blants |
| 7,084,758 | B1 | 8/2006 | Cole |
| 2002/0032589 | A1 | 3/2002 | Shah |
| 2002/0194246 | A1 | 12/2002 | Moskowitz et al. |
| 2004/0010327 | A1* | 1/2004 | Terashima et al. .............. 700/83 |
| 2004/0113772 | A1 | 6/2004 | Hong |
| 2005/0039136 | A1 | 2/2005 | Othmer |
| 2005/0060072 | A1 | 3/2005 | Harumoto et al. |

(Continued)

FOREIGN PATENT DOCUMENTS

| CN | 1376996 A | 10/2002 |
|---|---|---|
| EP | 1542462 A2 | 6/2005 |

(Continued)

OTHER PUBLICATIONS

Examination Report dated Feb. 8, 2011 from EP10154863.4.

(Continued)

Primary Examiner — Daquan Zhao
Assistant Examiner — Syed Hasan
(74) Attorney, Agent, or Firm — Schwegman Lundberg & Woessner, P.A.

(57) ABSTRACT

Systems and methods are provided for providing and displaying enhanced banners and other objects on a communication device. The banner file may comprise ancillary data, such as calendar appointment details, other event details, or contact details, embedded within the file itself, or comprised in an envelope wrapping the banner file. When the banner is displayed on the communication device, the user may invoke a context menu to create an event, such as a calendar event, on the device using the embedded ancillary data. In other embodiments, the communication device uses geolocation services to determine whether the user is likely to be in attendance at an event, and if not, to issue alerts or initiate a further action, such as initiating recording of a television program the user is about to miss, over the network. In other embodiments, the banner file's ancillary data includes recommendation data, identifying a banner as being recommended by a contact of the user's.

4 Claims, 12 Drawing Sheets

(56) References Cited

U.S. PATENT DOCUMENTS

| | | |
|---|---|---|
| 2005/0213938 A1* | 9/2005 | Ozawa et al. .................. 386/83 |
| 2006/0095859 A1 | 5/2006 | Bocking et al. |
| 2006/0136121 A1 | 6/2006 | Eisen |
| 2006/0248557 A1 | 11/2006 | Stark et al. |
| 2006/0288013 A1 | 12/2006 | Maekawa et al. |
| 2007/0008321 A1 | 1/2007 | Gallagher et al. |
| 2008/0033778 A1 | 2/2008 | Boss et al. |
| 2008/0079566 A1 | 4/2008 | Singh et al. |
| 2008/0082561 A1 | 4/2008 | Dere |
| 2008/0082651 A1 | 4/2008 | Singh et al. |
| 2008/0086455 A1 | 4/2008 | Meisels et al. |
| 2008/0132221 A1 | 6/2008 | Willey |
| 2008/0133282 A1 | 6/2008 | Landar et al. |
| 2008/0139245 A1* | 6/2008 | Huh et al. .................. 455/556.2 |
| 2008/0167937 A1 | 7/2008 | Coughlin et al. |
| 2008/0167938 A1 | 7/2008 | Meisels et al. |
| 2008/0195312 A1 | 8/2008 | Aaron et al. |
| 2008/0195448 A1 | 8/2008 | May |
| 2008/0215428 A1 | 9/2008 | Ramer et al. |
| 2009/0024439 A1 | 1/2009 | Ryan et al. |
| 2009/0036148 A1 | 2/2009 | Yach |
| 2009/0102637 A1 | 4/2009 | Hsu |
| 2009/0170532 A1 | 7/2009 | Lee et al. |
| 2009/0193087 A1 | 7/2009 | Lee et al. |
| 2009/0311992 A1 | 12/2009 | Jagetiya |
| 2009/0322904 A1 | 12/2009 | Takahashi |
| 2010/0010864 A1 | 1/2010 | Lee et al. |
| 2010/0050185 A1 | 2/2010 | Doss et al. |
| 2010/0094529 A1 | 4/2010 | Gupta et al. |
| 2010/0175001 A1 | 7/2010 | Lazarus et al. |
| 2010/0192162 A1 | 7/2010 | Conner et al. |

FOREIGN PATENT DOCUMENTS

| | | |
|---|---|---|
| EP | 1912437 A1 | 4/2008 |
| EP | 1950966 A1 | 7/2008 |
| EP | 2020643 A1 | 2/2009 |
| EP | 2026215 A1 | 2/2009 |
| EP | 2056244 A1 | 5/2009 |
| WO | 2007/072057 A1 | 6/2007 |

OTHER PUBLICATIONS

Close-up Media, Inc., "DirecTV DVR Scheduler Now at Apple Store", Wireless News Close-up, Jan. 1, 2009, 1 pg.

Movius, "Evaluating Mobile Device Platform Strategies to Support Interactive Mobile Advertising", accessed 2009, http://www.moviuscorp.com/research/white_papers/form/?id=9 (registration required), pp. 1-6.

Nokia, "Case Study—MTV: The Best Years", accessed Jul. 16, 2009, http://advertising.nokia.com/case-studies/the-best-years, 3 pgs.

Tsirulnik, G., "TiVo Goes Mobile", accessed Jul. 15, 2009, http://www.mobilemarketer.com/cms/news/television/2185.html, pp. 1-3.

European Search Report dated Jun. 4, 2010 from EP 10154863.4.

Extended European Search Report from EP10154863.4 dated Sep. 24, 2010.

"European Application Serial No. 10154863.4, Summons to Attend Oral Proceedings dated Dec. 13, 2011", 8 pgs.

"European Application Serial No. EP10154863.4, Office Action mailed Jul. 8, 2011", 6 pgs.

"European Application Serial No. EP10154863.4, Response filed Jun. 14, 2011 to First Office Action mailed Feb. 8, 2011", 13 pgs.

"European Application Serial No. EP10154863.4, Response filed Nov. 29, 2010 to Extended European Search Report mailed Sep. 24, 2010", 13 pgs.

"European Application Serial No. EP10154863.4, Response filed Nov. 8, 2011 to Second Office Action mailed Jul. 8, 2011", 13 pgs.

Gordon, John, "Google Calendar Gadgets", [Online]. Retrieved from the Internet: <URL:http://tech.kateva.org/2007/08/google-calendar-gadgets.html>, (Aug. 15, 2007).

"Application Serial No. 10154863.4, Office Action mailed Jan. 10, 2013", 13 pgs.

"Application Serial No. 10154863.4, Response filed Aug. 10, 2012 to Office Action mailed Dec. 13, 2011", 11 pgs.

"Canadian Application Serial No. 2,732,057, Office Action mailed Jun. 13, 2013", 2 pgs.

"Canadian Application Serial No. 2,732,057, Response filed Dec. 13, 2013 to Office Action mailed Jun. 13, 2013", 4 pgs.

"Chinese Application Serial No. 201110049680.2, Office Action mailed Jan. 6, 2014", w/English translation, 8 pgs.

"Chinese Application Serial No. 201110049680.2, Office Action mailed Apr. 28, 2013", w/English translation, 10 pgs.

"Chinese Application Serial No. 201110049680.2, Response filed Sep. 10, 2013 to Office Action mailed Apr. 28, 2013", w/English claims, 11 pgs.

"European Application Serial No. 10154863.4, Examiner Interview Summary mailed Sep. 25, 2012", 6 pgs.

"European Application Serial No. 10154863.4, Minutes of Oral Proceedings mailed Jan. 10, 2013", 6 pgs.

"Chinese Application Serial No. 201110049680.2, Response filed Mar. 11, 2014 to Office Action mailed Jan. 6, 2014", w/English claims, 11 pgs.

* cited by examiner

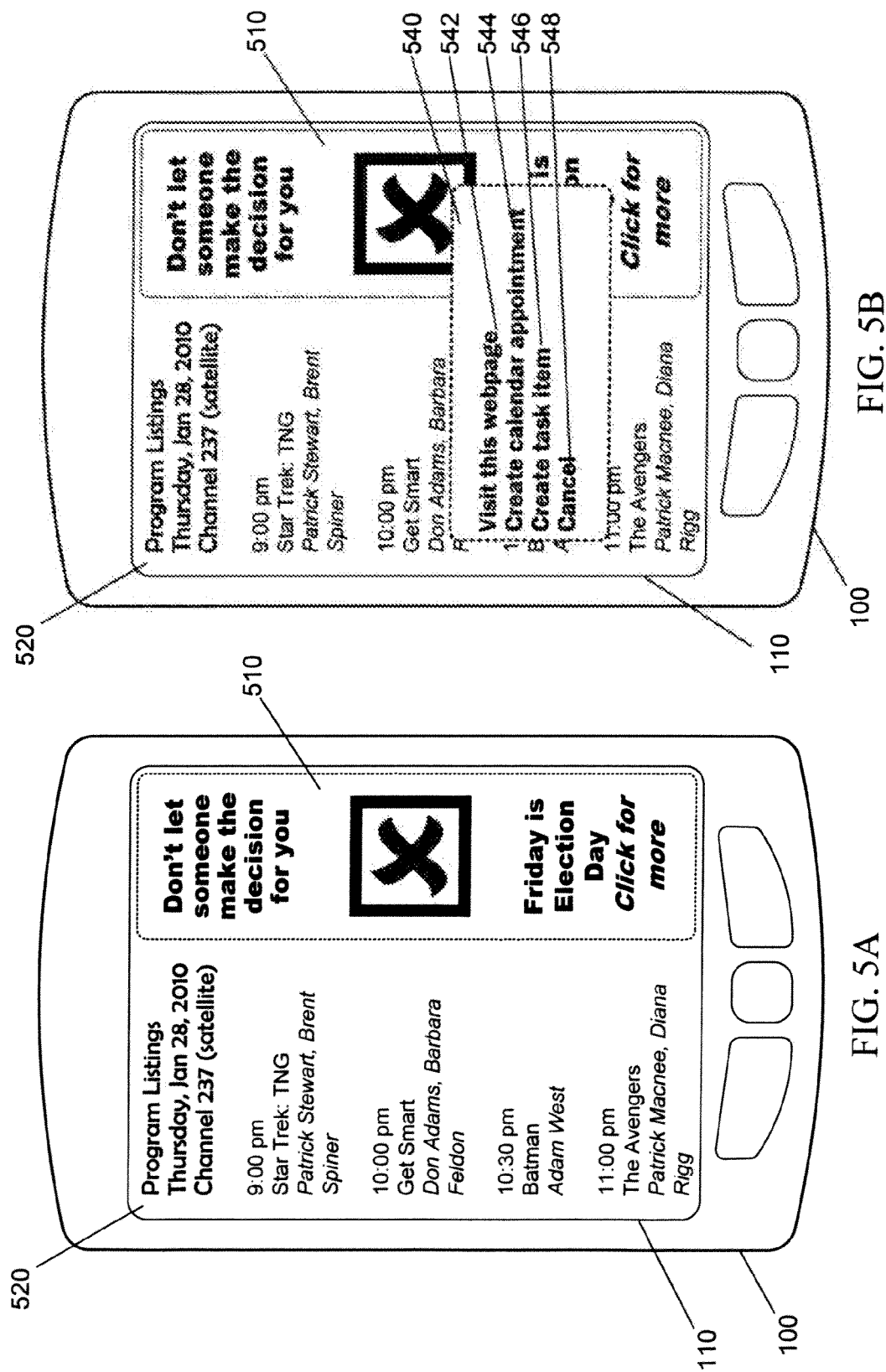

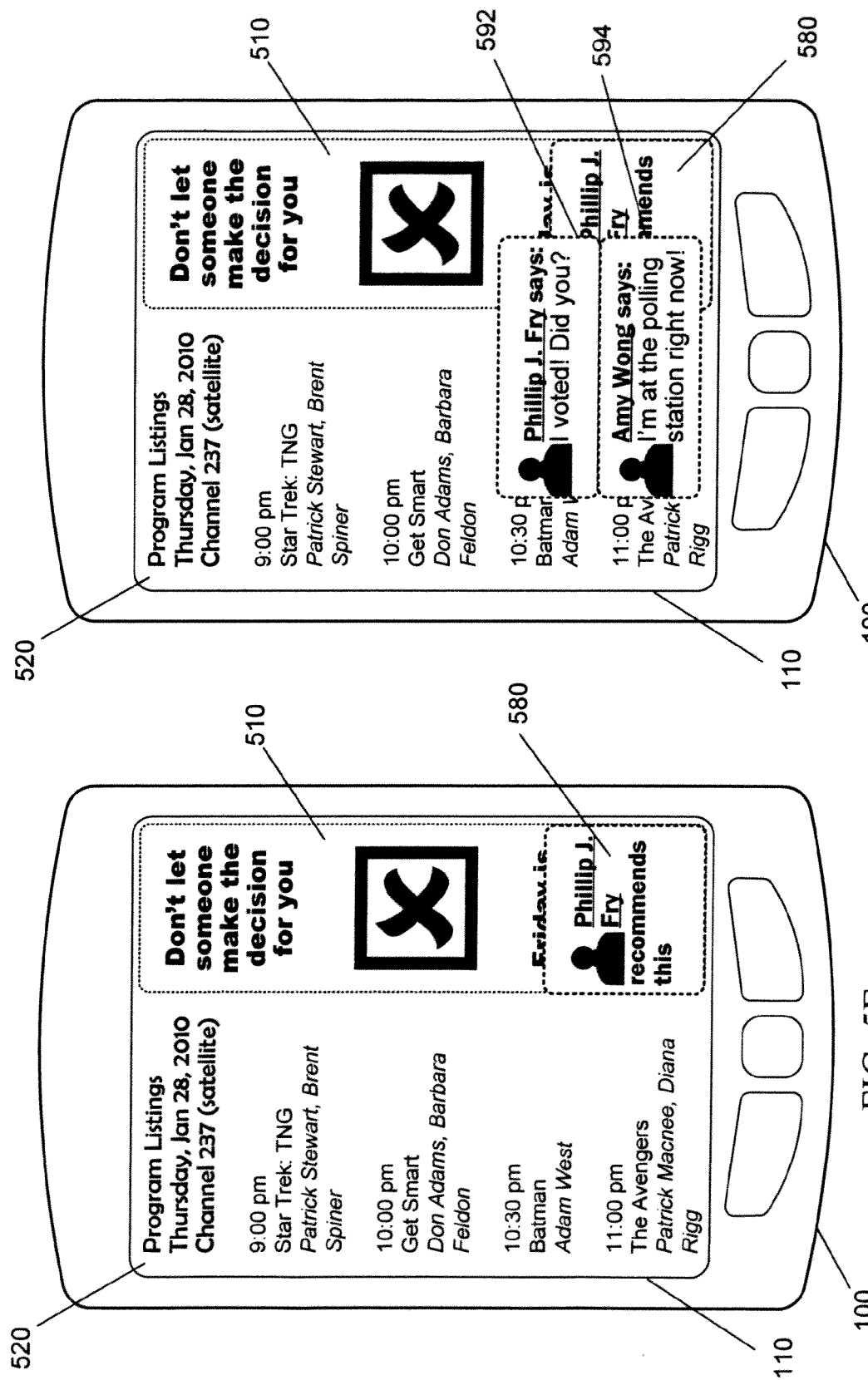

ENHANCED BANNER ADVERTISEMENTS

BACKGROUND

1. Technical Field

The present application relates to the display and function of banner advertisements on communication devices.

2. Description of the Related Art

Users are accustomed to viewing advertisements while engaging in web browsing. Advertisements are often delivered to users as "banners", which are primarily graphics files inserted into other content (e.g., embedded on a webpage). When a banner or other insert advertisement contains subject matter of interest to the user, the user must click on or otherwise actuate the banner to visit a website to obtain more information. This results in an interruption in the user's activities, meaning the user may be less likely to want to click on the banner.

Furthermore, while some banners may contain rich media, such as videos or interactive features, the banner itself only provides information to the user so long as the user is looking at it or interacting with it. Generally, banner advertisements do not provide additional user-relevant data.

BRIEF DESCRIPTION OF THE DRAWINGS

In drawings which illustrate by way of example only embodiments of the present application.

FIGS. 5A to 5F are illustrations of user interfaces of the mobile device of FIG. 1.

DETAILED DESCRIPTION

The embodiments described herein provide a system and method for enhanced banners and other elements that may be inserted or displayed in conjunction with other content, such as webpages and specialized applications, and usage of these enhanced banners and elements on a communication device. These embodiments will be described in relation to a communication device, such as a mobile communication device, having a display for displaying content within a graphical user interface. It will be appreciated by those skilled in the art, however, that this description is not intended to limit the scope of the described embodiments to mobile communication devices. The methods and systems described herein may be applied to any appropriate communication or data processing device capable of communicating over a network, whether portable or wirelessly enabled or not, including without limitation cellular phones, smartphones, wireless organizers, personal digital assistants, desktop computers, terminals, laptops, tablets, handheld wireless communication devices, wirelessly-enabled notebook computers and the like.

Figure 1:
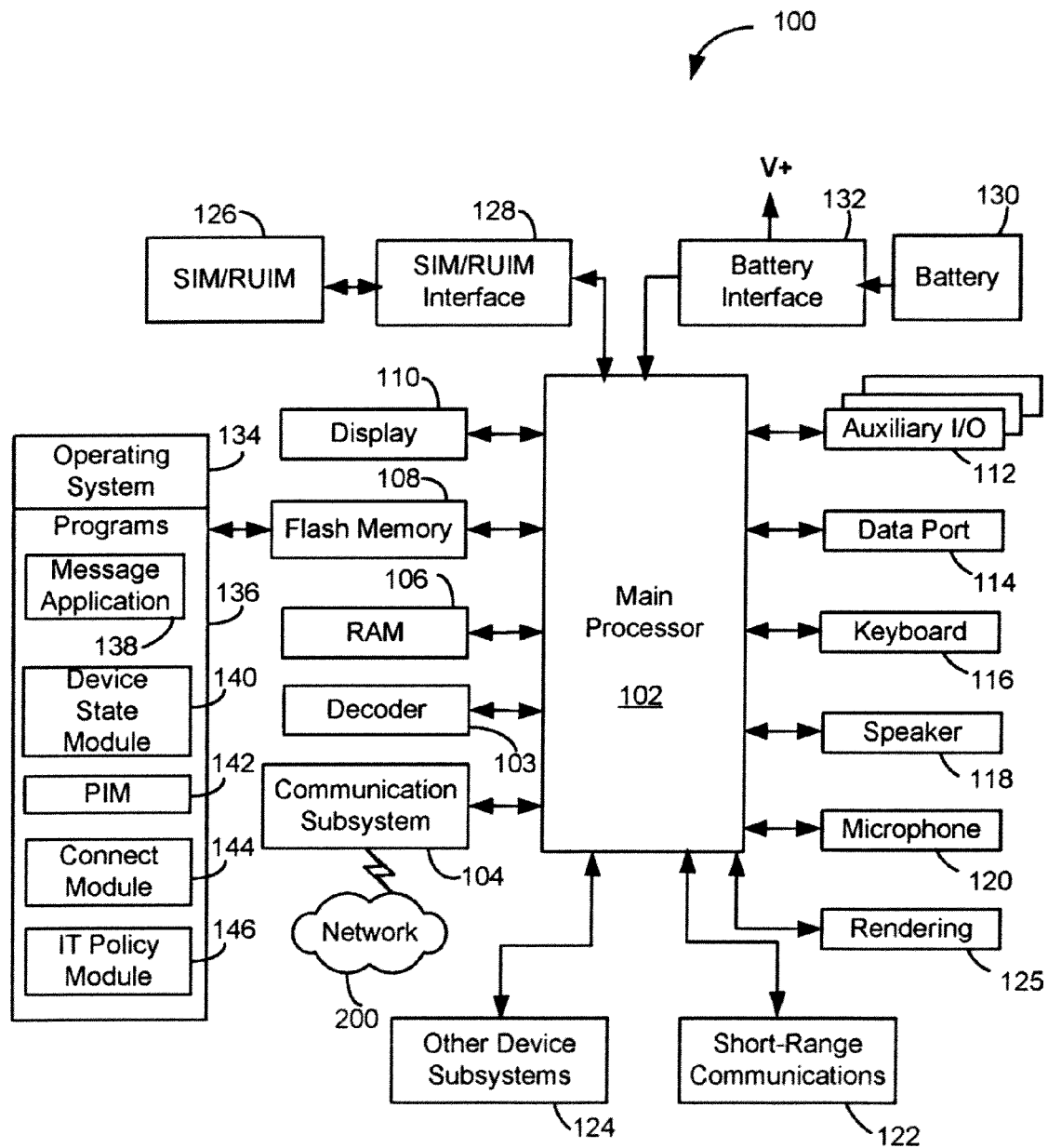
FIG. 1 is a block diagram of an embodiment of a mobile device.
Figure 2:
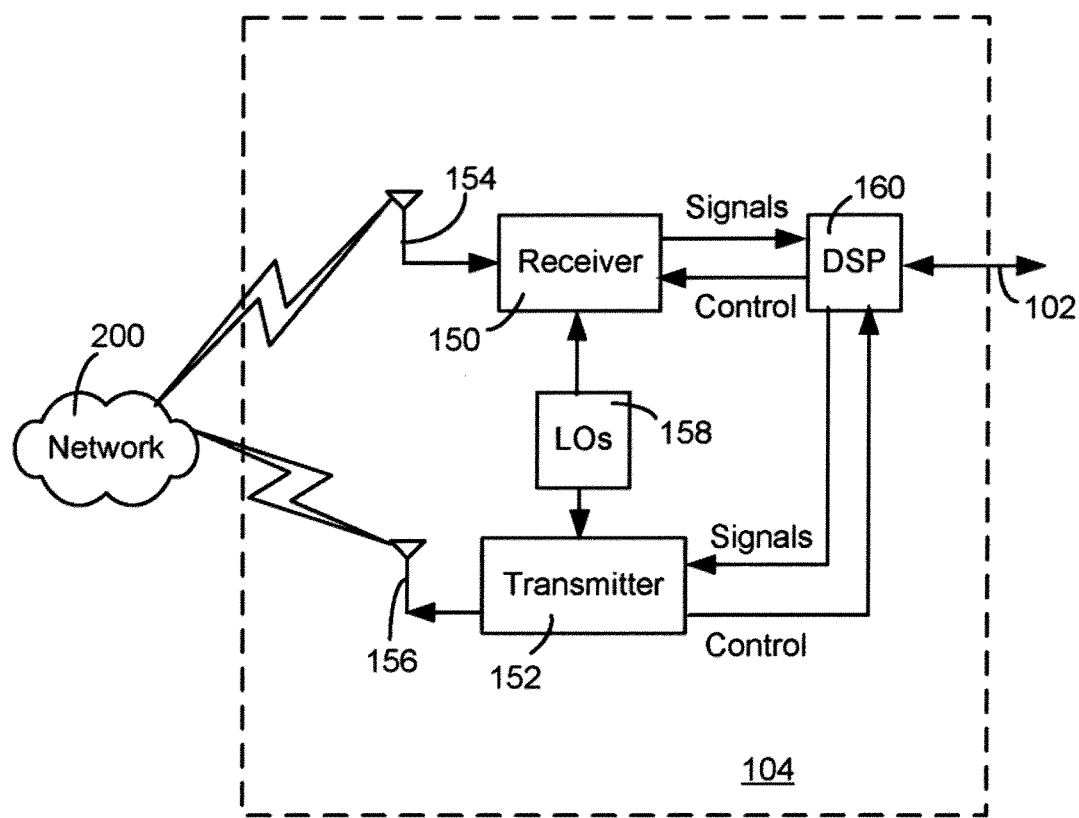
FIG. 2 is a block diagram of an embodiment of a communication subsystem component of the mobile device of FIG. 1.
Figure 3:
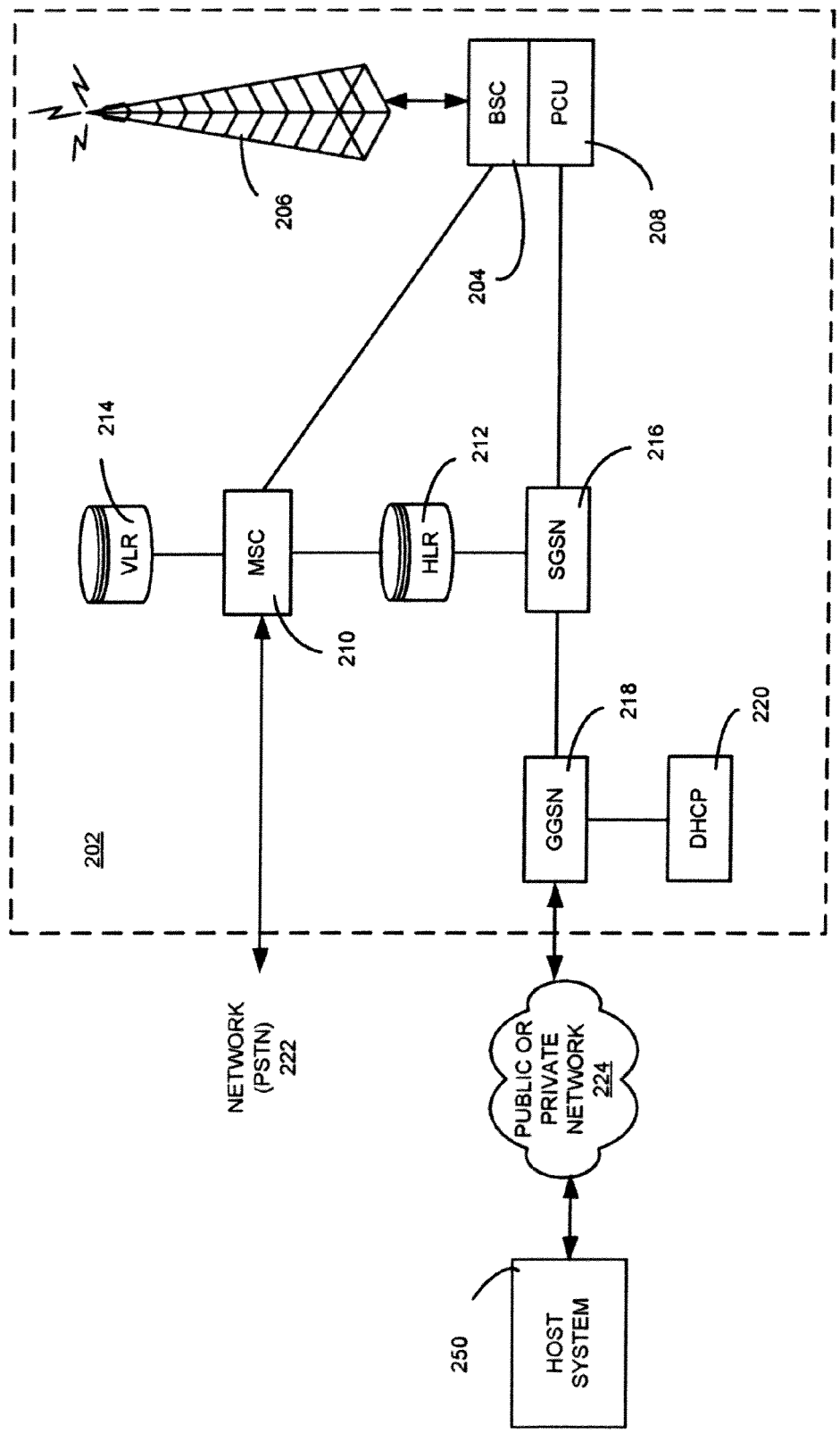
FIG. 3 is an exemplary block diagram of a node of a wireless network for use with the mobile device of FIG. 1.
Figure 4:
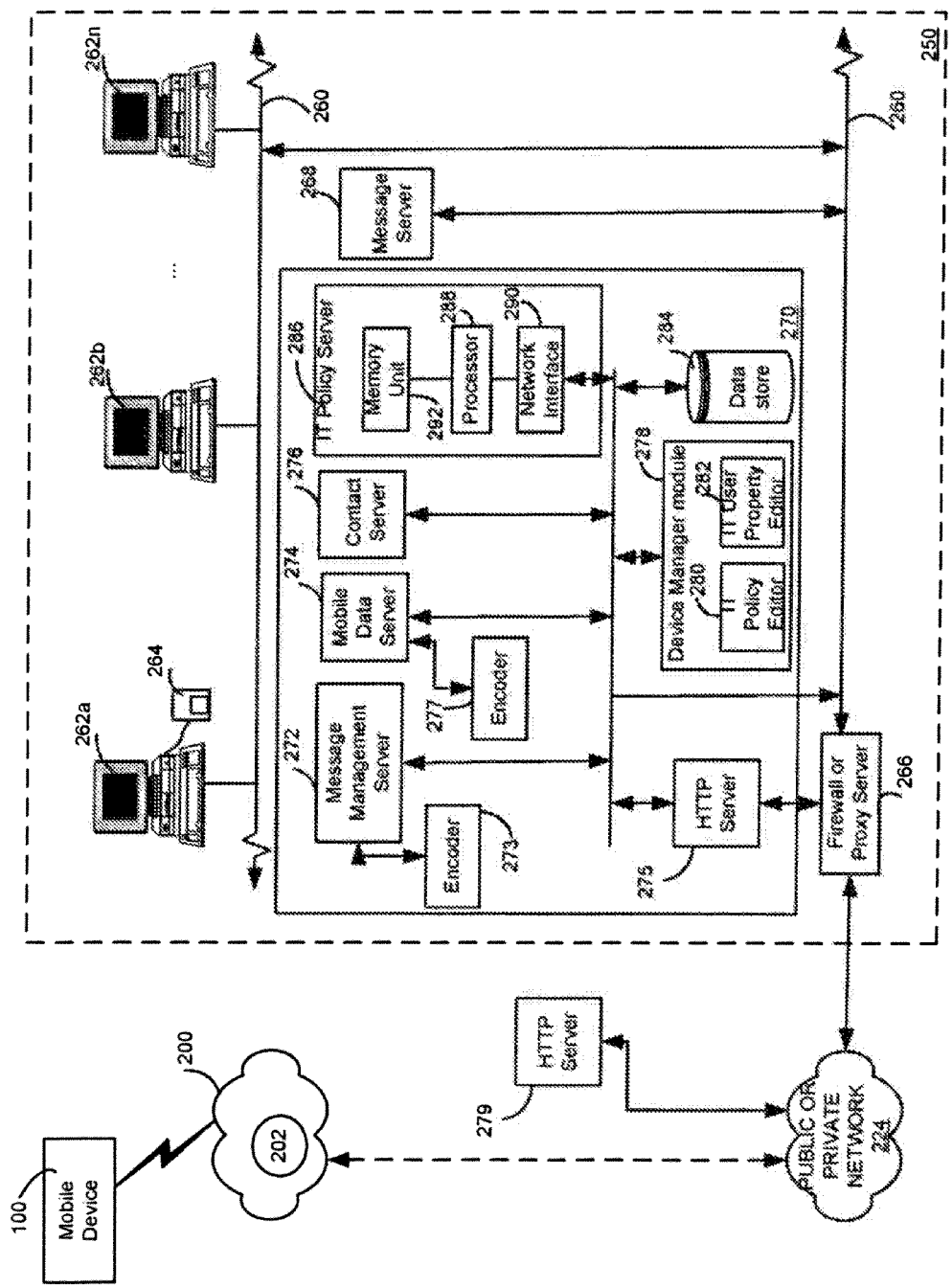
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering or layout circuit or engine 125 is included in the device 100. When a user specifies that a data file is to be viewed on the display 110, the rendering circuit or engine 125 analyzes and processes the data file for visualization on the display 110. Rendering circuit or engine 125 may be implemented as hardware, software, or as a combination of both hardware and software.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic W assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262*a* to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262*a*-262*n* are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the opera ion of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262*a* can request the e-mail messages associated with that user's account stored on the data store associated with the message server 268. These messages are then retrieved from the data store and stored locally on the computer 262*a*. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Rendering data files originally optimized or prepared for visualization on large-screen displays on a portable electronic device display often requires additional processing prior to visualization on the small-screen portable electronic device displays. According to an embodiment, this additional processing is accomplished by the rendering engine 125 shown in FIG. 1. As will be appreciated by those of skill in the art, the rendering engine can be implemented in hardware, software, or a combination thereof, and can comprise a dedicated image processor and associated circuitry, or can be implemented within main processor 102.

The embodiments described herein are described in the context of a client communication device and client browser application in communication with a service over a network. As discussed above, the communication device 100 may receive data relating to a resource from an external web server or other server from the mobile data server 274 of FIG. 4, which in turn is connected to a public network such as the Internet via the HTTP server 275 such that it is in communication with the external web server or other server. The receipt of data from an external server may bypass the mobile data server 274, and data may instead be received from an HTTP server 279 external to the host network. Regardless of the means by which the resource is received by the client device 100 for display, the resource received from a server over the network 224 may be rendered by the rendering engine 125 for display on the client device's display 110.

Turning to FIG. 5A, a first embodiment of a banner insert or advertisement 510 is shown, displayed on the display 110 of a communication device 100. The content 500 displayed on the display 110 may be divided between the banner 510 and other content, such as a user interface 520 for an application executing on the device 100. The banner 510 may display information to the user that is relevant to the content displayed in the user interface 520, or it may be irrelevant. For example, the application may be a television program listing browser (as shown in FIG. 5A), which allows the user to search for and display television programs for a specified region and/or time period, and to obtain detailed program information. The banner 510 may be an advertisement for a particular program listed in the search results displayed in the interface 520 or for another program that is not listed, but may be determined to be potentially of interest to the user in view of the user's search parameters. Or, the banner 510 may be an advertisement for an event taking place in the user's area, determined either with GPS functionality operating at the communication device, or based on the region defined in the user's search. Alternatively, the event may be a broadcast over the network, so that the user's precise region is irrelevant. The banner 510 may even be an advertisement for a product available for purchase, which is unrelated to the content displayed in the user interface 520. The banner 510 in that case may include, or reference, a retailer or list of retailers offering the advertised product for sale. Although the embodiments described herein are set out in the context of a television program listing browser, it will be appreciated by those skilled in the art that the application executing on the device 100 and the context within which the banner 510 is displayed may be any application or context, and is not limited to a television program listing browser. For example, the application executing on the device 100 may be any entertainment, utility, or productivity application, and its subject matter may be unrelated to the content of the banner 510. As another example, the application may be a web browser application, in which case the content displayed on the device 100 may be a webpage of the user's choosing served to the device 100, and again, the content of the webpage may be unrelated to the content of the banner 510.

In this example and the other described herein, the banner 510 may not comprise an actual advertisement, that is to say a communication intended to persuade the user to embark on a course of action or use a particular good or service. The banner 510 may be informative in nature, such as a public service reminder. Although the term "banner" is used with reference to the banner 510, the banner 510 need not be shaped in a conventional banner shape or positioned in a conventional banner orientation. Generally, a "banner" comprises a typically image-based file displayed in a particular region on a user interface, for example as a ribbon across the top, bottom, left, right, or a middle section of the user interface displayed on the device 100. However, the banner 510 may be a smaller or larger graphic or differently shaped. The shape and position of a banner 510 when served with other content, such as a banner advertisement on a webpage, is often defined by the service provider serving the other webpage content, or in the example of FIG. 5A, by the developer of the application executing on the device 100, or by the operating system of the device 100. While most banners are image-based, they may contain rich media, such as animated graphics or video. A common platform for animated banners is Adobe Flash, from Adobe Systems Incorporated, San Jose, Calif., USA. Display of Flash banners requires that the device 100 support the Flash file format by executing a dedicated player application or plug-in. Advertisements displayed to users via a web browser interface include the foregoing, as well as other types of special-effect advertisements such as floating advertisements, which travel over existing content already displayed on the device (such as the webpage requested by the user). Again, the use of such special-effect advertisements requires that the communication device 100 on which they are intended to be displayed supports the file format or platform used by the advertisement. A banner 510 may also comprise HTML code, rather than an image file or a video or Flash file, to be rendered in a specific region of the display 110. The banner 510 may include any one of these technologies. In other words, the banner 510 is an object that may be displayed in conjunction with other content on the display 110, and that may in fact be embedded within other content, as a graphic is embedded in a webpage, but this object is generally maintained and stored independently of the other content with which it is displayed or in which it is embedded, and is often served to the communication device 100 from a different server, and in response to a separate and differently-addressed request from the device 100. For simplicity, the examples described herein are provided in the context of an unanimated, image-based advertisement.

The data for rendering the banner 510 on the communication device 100 is provided to the device 100 over the network, either before or during application execution. The device 100 may store a banner 510 and its associated data in memory for retrieval when a suitable application is launched on the device 100; when the application is launched, the device 100 determines that there exists banner 510 data stored in memory for display with the application. If no banner 510 data is available from the device memory, then the device operating system or the application may initiate a request over the network from a server providing banner 510 data. The server providing the banner 510 data may be a server serving other data for use by the application, or may be a separate server operated by the same or a third party as that operating the server providing the application data. For example, if the application executing on the device 100 is a television program listing application, the data populating the television listings or responding to the user's search requests may be served by an electronic program guide server. The banner 510 may also be served from the same electronic program guide server or from another server operated by the electronic program guide content provider, but alternatively the banner 510 may be provided to the device 100 by another server, such as one operated by an advertising service that contracts with content providers to supply banner advertisements to be displayed alongside the content provider's content. When the television program listing application is launched on the communication device 100, the application may initiate a request to an identified uniform resource indicator (URI) to obtain banner 510 data. The application's request may be transmitted by the device 100 and addressed specifically to the service that provides the banner 510 data; in response, the service will provide the banner 510 data to the device 100 over the network. Alternatively, the request may be transmitted to another service that determines how the request should be serviced; for example, the service receiving the request may determined from data embedded in the request that the request was invoked by a specific application, and then may obtain the appropriate banner 510 data from yet another service, then provide the data to the device 100. In the case of an application such as a web browser application, the browser may retrieve a webpage over the network, containing a directive to the browser to request an embedded object, namely the banner 510, using an embedded URI. The browser would render the webpage and, once the directive was parsed, transmit the request to the URI. The URI may be an address for the resource that comprises the banner 510, so the server hosting the banner 510 would respond to the request by providing the banner 510. Alternatively, the resource addressed by the URI may execute instructions to identify the appropriate banner 510 hosted by another service, and may retrieve a copy of the banner 510 on behalf of the browser, and then transmit the banner 510 to the device 100.

The information provided in or with the banner 510 may be dynamically selected. For example, the server providing the banner 510 may select the actual banner 510 to be served based on data embedded in the request transmitted from the application executing on the device 100; there may be a token or other identifying information comprised in the web browser's request identifying the webpage, other data about the application, the type of communication device 100, other information that is then used by the server to select the appropriate banner 510. For example, if the data transmitted in the request indicated that the device 100 from which the request was transmitted was in a particular country or geographic region, the banner 510 transmitted in response to the request may be one with content specifically intended for the residents of that region.

The banner 510 that is provided to the device 100 for display may be relatively simple, comprising only a graphic file associated with a URI, the URI comprising an address for a resource (such as a webpage or other document) accessible over the network by the device 100. Both the file comprising the banner 510 and the URI are provided to the device 100. When an input is received at the device 100 to actuate the banner 510 or an instruction associated with the banner 510, for example by detection of movement of a cursor to the banner 510 or otherwise movement of focus to the banner 510 and then activation of the banner 510 via a user interface subsystem 112 (such as a keypress on a keyboard, a tap on the area of a touchscreen in which the banner 510 is displayed, or other actions and interface subsystems that will be known to those skilled in the art), a responsive action is initiated by the communication device 100 or application. The responsive action may be a request for the resource over the network at the URI provided with the banner 510. The response by the server processing the request may be to provide the resource itself If the application executing at the communication device 100 is a web browsing application, the browsing application may transmit an HTTP request for the resource identified by the URI; if the resource is another webpage, then the browsing application will either display this new resource in the current viewing area of the display 110, or open a new window or viewing area to display this new resource. If the banner 510 is a more sophisticated element comprising rich media features, such as video or Flash technology, the banner 510 may be interactive; the user may be able to use one of the input subsystems 112 to interact with the banner 510, for example to answer survey questions or play a game provided in the banner 510. Generally speaking, banners are frequently associated with a URI so that the input received may trigger an instruction to retrieve a further resource related to the banner. Once that new resource has been retrieved and displayed to the user on the device 100 in response to the received input, the new resource may display new information to the user about the subject matter of the banner 510. The new resource, if it is a webpage or other applet or application, may provide some functionality to the user. If the new resource is a webpage, the user may interact with the various elements presented on the webpage.

Thus, banner advertising may be effective solely because it is displayed to the user of the device 100 and potentially makes an impression on the user. However, an input instruction must be received by the device 100, for example by the user taking a positive action of clicking on or otherwise actuating the banner to obtain further information about the subject matter of the banner 510. The user may not wish to do this at the time the banner 510 is viewed, and may wish to defer further investigation for another day. However, the user may forget to do so; and the next time the same webpage or application is launched or used, the banner 510 selected for delivery to the device 100 may have been changed. Or, the user may not wish to obtain further information because actuating the banner 510 involves not only interrupting the use of the current application, but also waiting for the device 100 to retrieve further information over the network. Thus, to the extent that banner advertising relies on the user "pulling" further information to the device, the requirement that the user actuate the banner 510 to retrieve a new resource is an inconvenience that reduces the effectiveness of this form of advertising.

Accordingly, the banner 510 is provided with ancillary data for use at the communications device 100. The ancillary data may be event-related information, contact information, or resource-related information, such as event start and ending dates, descriptions, addresses, telephone numbers, and the like. In the example of FIG. 5A, the banner 510 contains a public service reminder about a by-election in the user's region, and invites the user to "click here" to learn more about voting. This particular banner 510 may be a graphic file associated with a first URI, so that when an input instruction to actuate the URI is received, the device 100 initiates a request to over the network for a resource identified by that URI. The first URI is thus one example of resource-related information. This first URI, however, may not be contained within the file comprising the banner 510 itself; the association with URI may be defined outside the banner 510 file so that this information is available to the application executing on the device 100. The associated URI may be provided to the device 100 at the same time that the banner 510 is provided to the device 100, or prior to the provision of the banner 510 to the device 100. For example, when the application is launched, the application may initiate a request to a first service over the network to provide the first banner 510 and associated URI, then display the banner 510 once it and the URI are received. If the application retrieves and displays webpages to the user, then the webpage received at the device 100 may associate the banner 510 with a URI using an HTML anchor element (<a>) within the code of the webpage. The associated URI is thus provided to the device 100, possibly in advance of the banner 510 being received by the device 100. The webpage may include the ancillary information, for example as additional XML-format tags within the webpage document associated with the banner 510 element, but this likely requires the web server providing the webpage to the device 100 to generate customized webpage HTML code to accompany the banner 510. If the banner 510 is dynamically selected according to the individualized requests received from the device 100, this requires additional resources at the web server. Further, if the banner 510 is intended to be served to devices 100 executing other applications besides web browsing applications, the banner 510 may be transmitted to a device 100 without the accompanying webpage HTML code.

Therefore, in one embodiment, the banner 510 may contain the ancillary data embedded within the file comprising the banner 510. If the banner 510 is a graphic, this ancillary data may be included in metadata or tags associated with the graphic file. The metadata may be embedded in the file itself; for example, the graphics file may be configured to include Extensible Metadata Platform (XMP) metadata. XMP is a standard providing for the definition, creation and processing of metadata for embedding into files, following an XML structure. Other standards for embedding data in a graphics file are known, such as Exchangeable Image File Format (EXIF) and IPTC-IIM. These standards generally define data types such as creator, title, and copyright information to be embedded in file. In particular, however, the XMP standard may be extended to include further data types. Thus, additional data stored in the file, in pseudo-XML structure, could include:

```
<banner:EventStartDate>2010-02-05T09:00-5.00</banner:EventStartDate>
<banner:EventEndDate>2010-02-05T21:00-5.00</banner:EventEndDate>
<banner:ReminderTime>3.00</banner:ReminderTime>
<banner:EventType>calendar</banner:EventType>
<banner:EventLocation>check your voter registration
card</banner:EventLocation>
<banner:EventName>Vote in the Toronto Centre By-Election</banner:EventName>
<banner:EventDescription>Polls close at 9 pm. Visit elections.on.ca for
more information.</banner:EventDescription>
```

The various names and values in the foregoing example may, of course, be varied, and the formatting or method of inclusion of the ancillary data may vary, and need not be expressed in the foregoing tagged format or name-value pair format. Other methods of embedding or adding ancillary information to a file will be known to those skilled in the art. In this example, data is given for an event start date and end date, a reminder time (i.e., a value in hours defining a time before the start of the event, at which time a reminder function can be invoked), an event type (such as a calendar event, task, docket item, e-mail, or other event or function that is definable with the foregoing data), an event location, an event name, and an event description. Not all of this data is required. When the user actuates, or an instruction is received at the device 100 to actuate, the banner 510 comprising this additional data, rather than initiate a request for an associated URI, the responsive action initiated at the device 100 may comprise an extraction of the metadata embedded in the banner 510 file. Since the banner 510 is likely stored in at least temporary, if not persistent memory at this time, it is not necessary to request the ancillary information over the network. The device 100 then parses the extracted metadata and automatically invokes a further application at the device 100 to process the data and to create the appropriate event. In this example, the device 100 may extract the data and determine that the event type is a "calendar" event, since this is specified in the metadata as EventType. The device 100 would then invoke a calendar application on the device 100 to create a calendar appointment, populating the various fields of the calendar appointment with corresponding metadata. Thus, a calendar appointment may be created on the device 100 with a starting date and time as specified by the EventStartDate and EventEndDate metadata, a reminder to be issued three hours in advance according to ReminderTime, a location of "check your voter registration card" (although this data could be replaced with the user's own location, or other information delivered with the banner 510), and an appointment name and description as set out above as EventName and EventDescription. Other data relevant to a calendar appointment, or whatever other type of event is created, may be included, such as participant names. If the event is a meeting with others, the calendar appointment may be populated with the names of other attendees identified in the metadata. The other attendees may be identified by name or e-mail address. If the service providing the banner 510 is identified as an attendee, a message may be sent to the service as a result of the calendar appointment creation, thus providing confirmation that the user exhibited interest in the banner 510. However, such a communication may first require the user's consent.

The calendar appointment may be automatically launched in the background while the current application is still operating in the foreground, if the communication device 100 is capable of multitasking, with the result that the user's experience of the current application is not visually interrupted by the display of the calendar application on the device. Otherwise, if the device's operating system cannot multitask in this manner, it may temporarily switch the current application to the calendar application so that the appointment may be added and saved, optionally requesting the user to confirm that the new appointment is correct and should be saved, and then switch back to displaying the user's application. While the latter presents an interruption to the user, the interruption is less than if the user were required to obtain more information about the subject matter of the banner 510 by actuating the banner 510 to retrieve a webpage from which the relevant information could be obtained before initiating the calendar appointment. In this embodiment, sufficient information is delivered together with the banner 510 so that the user can store sufficient information for later reference, and can easily set up a reminder or appointment to review the subject matter of the banner 510. If the description of the event includes a URI, then storing the calendar event also stores the URI that the user can later use to learn more, without having to invoke a browsing application, retrieve the resource at that URI, and then bookmark the URI for later reference.

As described above, actuating the banner 510 results in the automatic creation of the calendar appointment. Alternatively, actuating the banner 510 with a primary action detected at the device 100, such as a left-click (i.e., actuation of a left-hand, or a primary, button on a multibutton user interface device, such as a mouse or trackball device) or some other primary action or instruction detected at the device 100 may result in the device 100 transmitting a request over the network for the associated URI, while actuating the banner 510 using a secondary action detected at the device, such as a right-click, may bring up a context menu for the user to select the option of either transmitting a request for the URI, or creating a calendar appointment from the embedded data, as shown in FIG. 5B. In FIG. 5B, a context menu 540 is displayed, giving the user the option of accessing a resource associated with the banner 542 ("Visit this webpage"), creating a calendar event 544 ("Create calendar appointment"), creating a task item 546 ("Create task item"), or cancelling and exiting the context menu 548 ("Cancel").

In another embodiment, the banner 510 may not have the ancillary information embedded within the file comprising the banner 510 itself. Instead, the ancillary information may be provided in an envelope "wrapping" or preceding the file when it is transmitted to the communication device 100. The ancillary information may be provided in name-value pairs, or any other suitable format. When the file comprising the banner 510 and its envelope are received at the communication device 100, the device 100 extracts the ancillary data from the envelope and temporarily or persistently stores it in memory for later access, should the user actuate the banner 510 to create a calendar appointment or other item on the device 100 based on the banner's ancillary data. The extracted ancillary data may be deleted from memory at the device 100 when the file comprising the banner 510 is itself deleted from memory.

In still a further embodiment, the ancillary information is not included either within the file comprising the banner 510, or in an envelope or other data transmitted to the device 100 with the banner 510. In that case, the application or device 100 may be configured so that when the banner 510 is actuated, a context menu is invoked on the display 110 providing the user the option to initiate retrieval of the ancillary information for the creation of a calendar or other event at the device 100. Again, if the operating system of the device 100 is capable of engaging in multitasking in this manner, the device 100 may transmit a request over the network to the URI associated with the banner 510 for the ancillary information, while the user continues to use the current application.

Also as noted above, the event need not be a calendar appointment. It may be a task event, in which case the ancillary information associated with the event may comprise a due date, a reminder date, and a name and description; it may be a docket event for use with a docketing program; or it may be any other type of event item associated with an application operating on the device 100. The event created at the device 100 may even be an e-mail, SMS, or other message for transmission to individual recipients or for posting to a service to which the user is subscribed, as discussed below. The ancillary information may include the e-mail or other messaging address of the recipient or service, a subject line for the message, and even content for the message body; a date or time included in the ancillary information may be interpreted as the date or time to transmit the message. The device 100 would invoke the appropriate application to create the task item, docket item, or e-mail, using the ancillary information provided for the banner 510.

There are other uses for the banner 510 and its ancillary information. The ancillary information may simply define a calendar event or task event with a description comprising a URI and either a start and end date that are close in time (if the ancillary information defines a calendar event), or a single due date (if the ancillary information defines a task event). When an instruction to actuate the banner 510 is received or detected by the device 100, for example by a user actuation action, the calendar appointment or task item is saved on the device 100, and effectively operates as a reminder to the user to obtain more information by retrieving the resource identified by the URL The URI stored in the description may include a token or some other generally unique code associated with the specific banner 510 giving rise to the calendar event or other event. When a request is transmitted from the device 100, the request may include this token or unique code. The server processing the request may use the token or unique code to store information about the user's interest in the banner 510, or to retrieve information specifically directed to that banner 510.

If the banner 510 is advertising a good or service, the ancillary information may include information about a retailer's location and a sale event, which may also be stored as a calendar or task item. If the banner 510 is advertising a television program, the ancillary information may include information about the channel and the start and end times, the name of the program, and optionally a description or other information.

Figure 6A:
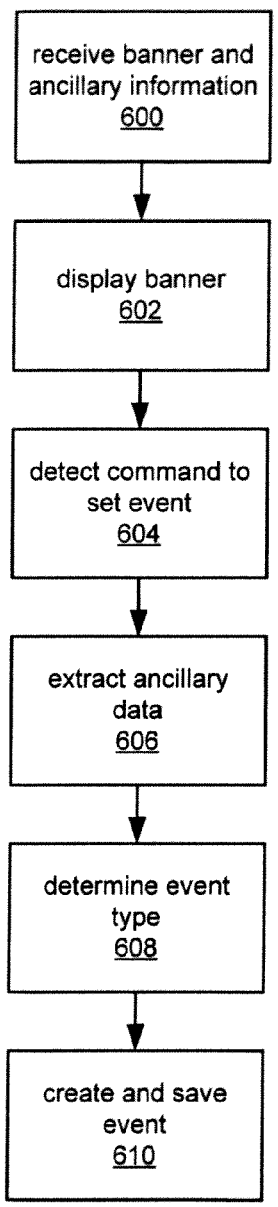
FIGS. 6A to 6C are flowcharts depicting methods for creating events at the mobile device.

Thus, FIG. 6A illustrates a method for creating an event at the communication device 100 using this ancillary information, where the ancillary information is included in the file comprising the banner 510. The banner 510 and the ancillary information are received at the device 100 at 600. As described above, the banner 510 file and the ancillary information may be received separately or together. The banner 510 is then rendered for display at the device 100 at 602. At 604, the device 100 detects the invocation of an instruction or command to set an event associated with the banner 510. At 606, in response to the command, the device 100 extracts the relevant ancillary information either from the file comprising the banner 510 itself, or from a separate file that was received in association with the banner 510. The device 100 then determines from the extracted ancillary information what type of event is to be created (e.g., a calendar appointment, a task item, and so forth) at 608. At 610, the device 100 creates and saves the new event using the extracted ancillary information, invoking the appropriate application necessary to do so.

Figure 6B:
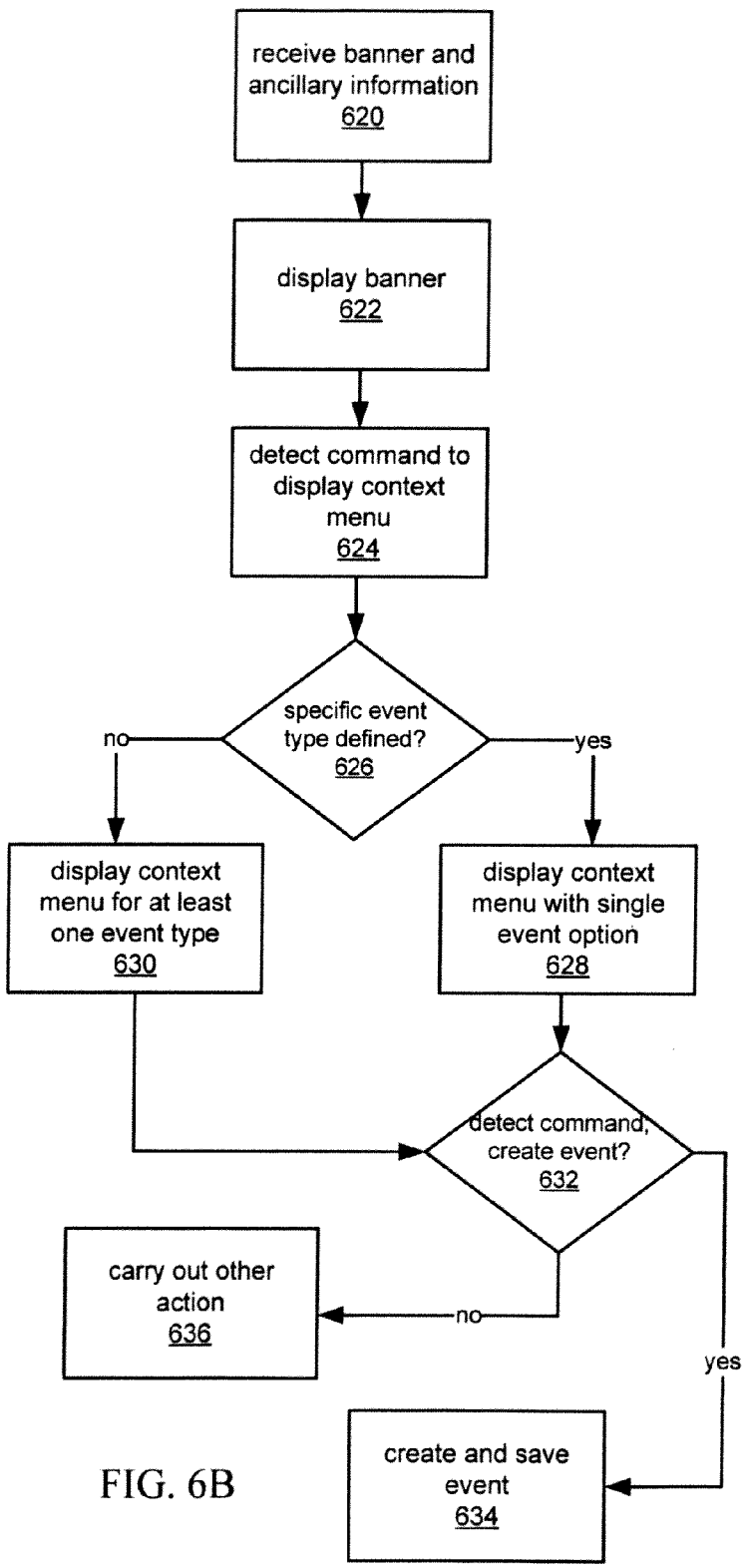

The process of FIG. 6A presumes that there is only one type of event that may be generated using the ancillary information. This may arise where the ancillary information expressly defines an event type (such as "calendar"). In FIG. 6B, a modified process is illustrated in which the ancillary data is capable of being used to generate multiple types of events at the device 100 because there may not be an express definition of an event type in the ancillary information, or where the device 100 presents a context menu to the user to select one or more options prior to creation of the event at the device 100. At 620, the banner 510 and the ancillary information are received at the device 100 as described above. The banner 510 is then rendered for display at the device 100 at 622. At 624, the device 100 detects the invocation of an instruction or command to invoke a context menu associated with the banner 510. At 626, in response to the command, the device 100 first extracts the relevant ancillary information either from the file comprising the banner 510 itself, or from a separate file that was received in association with the banner 510, to determine whether the ancillary information defines a specific event type. If the ancillary information defines a specific event type, then at 628 the device 100 displays a context menu on the display 110 including the option to create the defined event type. If the ancillary information does not define a specific event type, then at 630 the device 100 displays a context menu including options to create at least one event type that is capable of being generated from the ancillary information. At 632, the device detects an instruction or command selected from the context menu and determines whether the command is one requiring creation of an event. If the command is a command to create an event, then at 634 the event is created and saved. If the command is for a different action, then at 636 the device 100 carries out this different action.

Figure 6C:
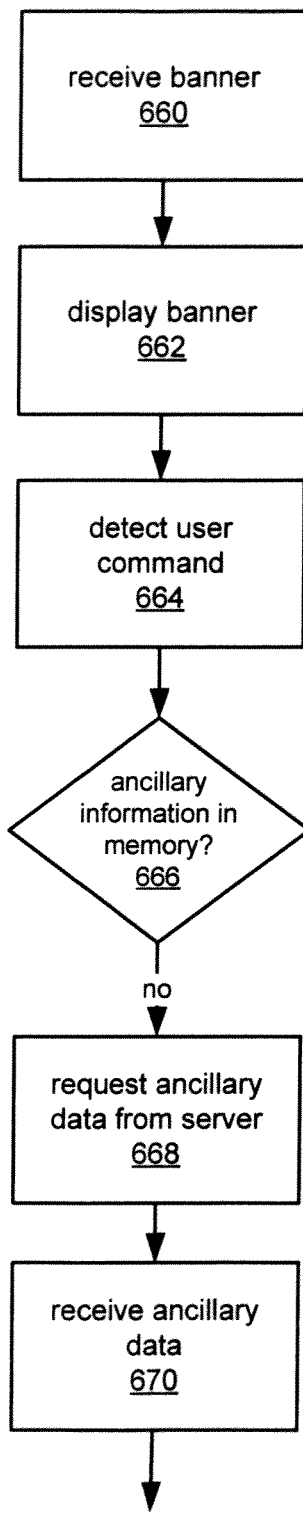

If the ancillary information is not already stored at the device 100, then a process such as that shown in FIG. 6C may be used. At 660, the banner 510 is received at the device 100, and the banner 510 is then rendered for display at 662. At 664, the device 100 detects a user command to either invoke a context menu, or to create an event from the banner 510. The device 100 then determines whether it is currently storing the ancillary information for the banner 510 at 666. If it is determined that the ancillary information is present at the device 100 already, then the process may continue either from step 604 in FIG. 6A or step 626 of FIG. 6B. However, if it is determined that the ancillary information is not present at the device 100, then at 668 the device initiates a request to a server over the network for the ancillary information. The request may be addressed to a URI associated with the banner 510 that is already stored at the device 100. Once the device 100 receives a response with the ancillary information at 670, the process may continue either from step 604 in FIG. 6A or step 626 of FIG. 6B.

The ancillary information associated with the banner 510 may be used to generate other personal information entries at the device 100, such as address book entries. The ancillary information may provide contact information such as an address, e-mail address, and telephone numbers. Example pseudo-XML content is provided below.

```
<banner:ContactName>Ten Forward</banner:ContactName>
<banner:ContactAddress>1701 Enterprise Avenue, 10th Floor
</banner:ContactAddress>
<banner:ContactCity>Planitia City</banner:ContactCity>
<banner:ContactPhone>416-555-1701</banner:ContactPhone>
<banner:ContactWebsite>www.tenforward.com</banner:ContactWebsite>
<banner:ContactDescription>Relaxing and laid-back restaurant and
lounge.</banner:ContactDescription>
```

Additional information that may be encoded in the ancillary data includes business hours, if the contact is a business or professional contact. In addition, additional description data may be provided. For example, if the contact is a restaurant, the description data may even in include menu information. The device 100 may create and save an address book entry using the methods described above.

The foregoing embodiments may be implemented in conjunction with a "smart" calendar, task, or other application that correlates events with the user's physical location or availability. As described above, the communication device 100 may be provided with GPS technology or may be configured to use other locational technology for determining an approximate position of the device 100. If the ancillary information received in conjunction with a banner 510 contains sufficient location information, the "smart" application may adapt reminders or alerts so that they are displayed to the user at a useful and relevant time. For example, a banner 510 described above may contain subject matter relevant to a sale of a particular item. If the device 100 had been operated to store a task item relevant to that banner 510, the task item might comprise a due date (corresponding to the last date of the sale), a name and description and optionally URI, a reminder time, and in addition to this data, locational information in a format parseable by the device 100. If the ancillary information was provided to the device in an XML-based format, the locational information may be provided in a name-value pair such as <banner:EventLocation>lat43.6478long-79.4007</banner:EventLocation>. With this locational information associated with the event stored at the device 100, when the device 100 obtains updated information about its current location, the device 100 may provide an update that may be viewed or otherwise perceived by the user when the device 100 determines that it is in the proximity, or at, the location associated with the event. Thus, the task item created at the device 100 based on the ancillary data for the banner 510 may have been configured to issue a reminder to the user eight hours before the due date of the task, to ensure that the user had enough time to carry out the task. Or, the task item may not have included a reminder time at all, but the device 100 would have only have provided an alert upon the occurrence of the due date for the task. However, if the device 100 determines that it is in the proximity of the task item location (for example, within 1 kilometer, or within some other specified proximity value), the device 100 may issue an immediate alert via the display 110, or via another interface subsystem 112 (such as a vibratory interface, an auditory interface, or the like) concerning the task. The user may thus be alerted to an opportunity to carry out the task, since he or she has found him or herself in the vicinity.

In another embodiment, the event may be a task item may be associated with a specific relevant date or time range, such that the task cannot be completed outside that range. In the example of FIG. 5A, the subject matter of the banner 510 is an event that takes place only during a defined 12-hour period, so a reminder in advance of the start time of the event may be less useful to the user than a reminder during the time period. In that case, if the device 100 determines that it is in the proximity of the task item location, the device 100 may then determine whether the current time is within the relevant time period for the task; if it is not, then the device 100 does not issue an alert for the user. If the current time is within the relevant time period, then the device 100 does issue the alert.

Figure 7:
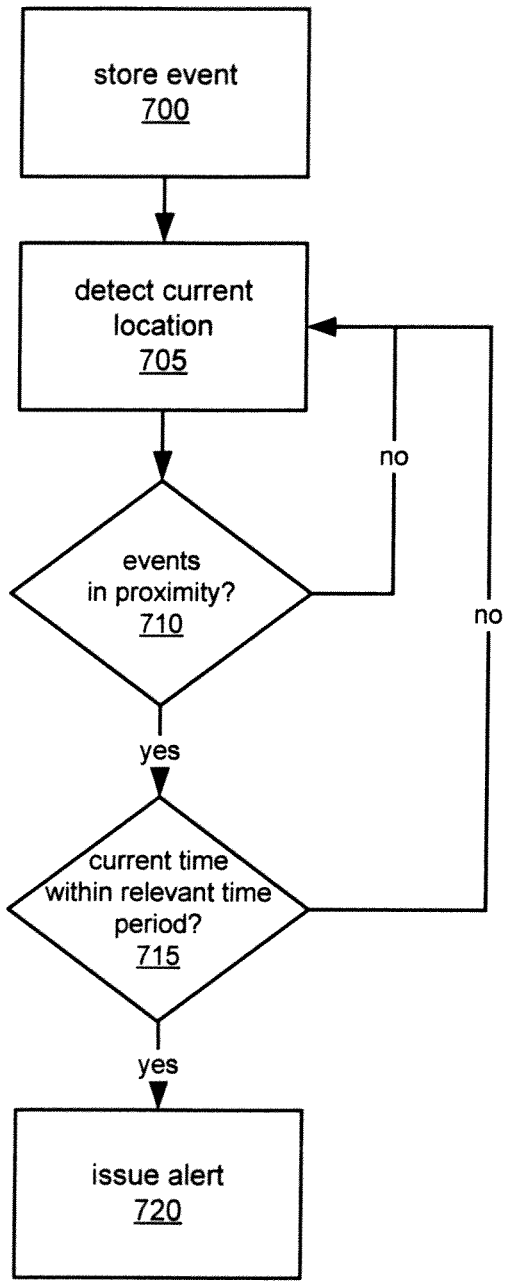
FIG. 7 is a flowchart depicting a method for determining whether an event is in the proximity of the mobile device.

FIG. 7 illustrates a method that may be implemented for this embodiment. At 700, the event is stored at the device 100, as described above. At 705, the device 100 detects its current geographic location using GPS or other means. Next, at 710, the device 100 queries its memory, for example a personal information store, for any events (calendar appointments, tasks, and so forth) associated with a geographic location within the proximity of the current geographic location. If an event is found, at 715 the device 100 may then determine whether the current time is within a relevant time period for the event that was found. If it is determined that the current time is within the relevant time period, then an alert is issued at 720. If the current time is not within the relevant time period, then the device 100 may wait for a further update of the current geographic location. The step of determining whether current time is within the relevant period may be skipped by the device 100, so the device would simply issue the alert for the user for that found event at 720.

Figure 8:
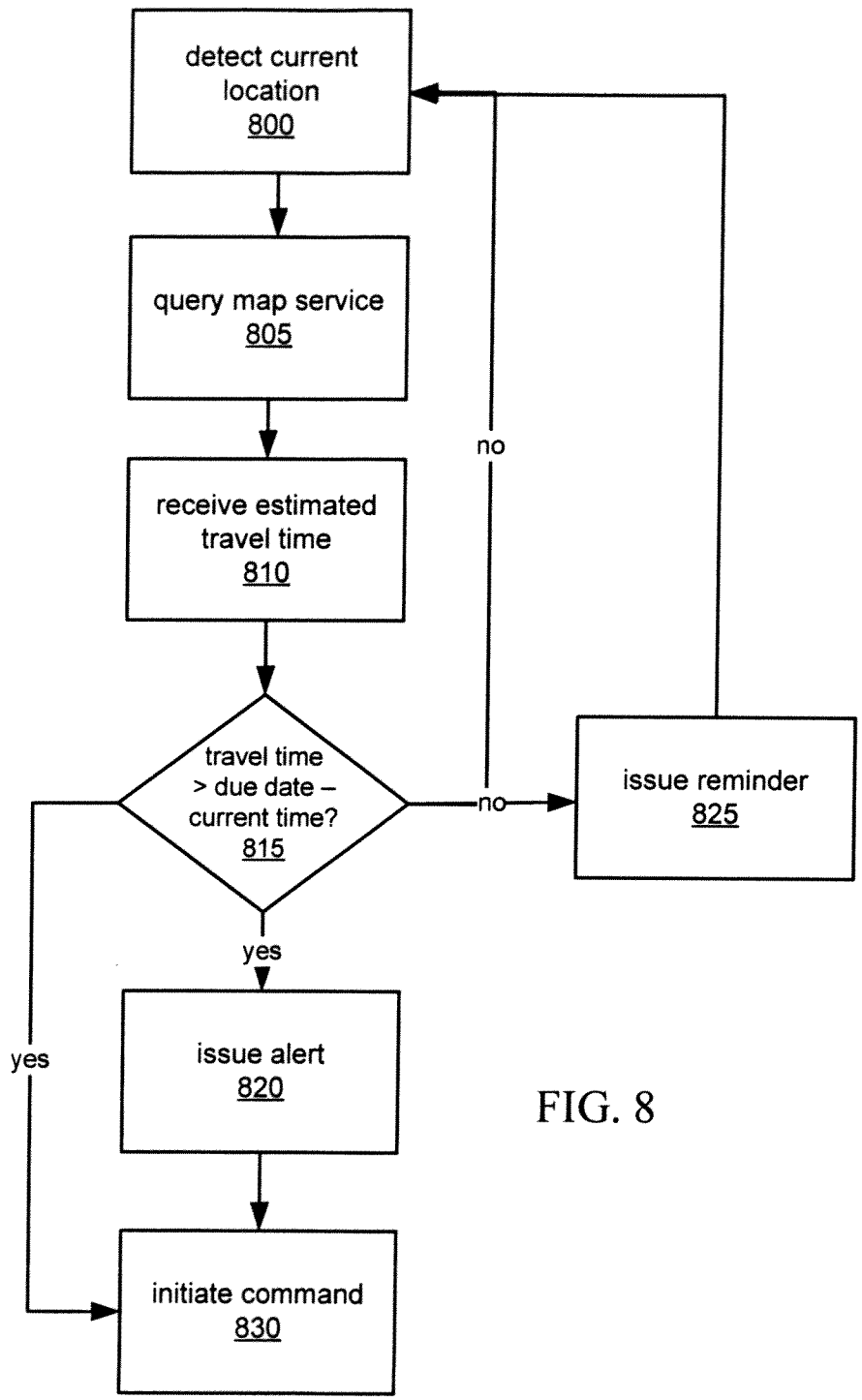
FIG. 8 is a flowchart depicting a method for determining a responsive action after comparing a user's estimated travel time to a location with the start time of an event.

The device 100 may also be configured to customize the timing of reminders or alerts provided based on the user's current distance from the location of an event. The device 100 may be configured to determine an approximate travel time for the user to arrive at each event associated with a specific location and stored at the device 100. The travel time may be determined from data provided to the device 100 concerning typical traffic flow, time of day, and method of transportation; thus, for example as shown in FIG. 8, the device 100 may first obtain its current location over the network from a geolocation service at 800, then query a map service over the network at 805, providing the device's current location and the event location in the query. At 810, the device 100 receives from the map service an estimated travel time from the current location to the event location based on mode of transportation, e.g. walking, driving, or by public transportation. The response from the map service may include estimated travel times for all modes of transportation, or may only provide one estimated travel time identified in the query. At 815, the device 100 compares the estimated travel time with the difference between the event due date (which may be the start time of a calendar appointment, or the last time in the relevant date or time range for a task) and the current time. If the estimated travel time exceeds the difference between the event due date and the current time, at 820 the device 100 may issue an immediate reminder or alert for the user regarding the event, even if the event had been preconfigured to issue an alert or reminder at a different time. The user is thus given an opportunity to make other arrangements, if possible; alternatively or additionally, as discussed below, the device 100 may be configured to initiate a command to be transmitted over the network at 830. If the difference between the event due date and the current time is greater than the estimated travel time, then the device 100 may either do nothing and await a new update of the current location at 800; or, the device 100 may still issue a reminder at 825 if the difference is within a specific range, such as 15 minutes or less, thus giving the user some warning of the upcoming event.

Further enhancements to the foregoing embodiments may be provided. The device 100 may further be configured by the user to store locational data for geographical landmarks relevant to the user. For example, the at various locations an application may be invoked, for example in response to a user-input command, for determining and storing locational data to store locational data in association with labels defined either by the user or by the device 100, such as "home", "work", "cottage", "mom and dad's house", "train station", "the pub", "grocery store", and so forth. The geographical landmarks may represent locations that the user attends on a regular, semi-regular, or even infrequent basis. While the user may explicitly define specific locations as "home" and the like, the device 100 may also be configured to determine the location of at least "home" and "work" locations based on a sampling of the device's geographical location throughout a weekday. It is typical for many users to be physically present, with their communication device 100, at a work-related location between the approximate hours of 9 a.m. and 5 p.m. each day, and at home at least from the hours of midnight to 6 a.m. The device 100 may be configured to automatically obtain and store readings of its geographical location several times a day, for several days, and from this data to determine, based on the frequency and proximity of results, an approximate location of "work" and "home".

When the device 100 subsequently obtains a reading of its current location, the device 100 may compare the current locational data to the stored locational data to determine whether the device 100 is in the proximity of any one of the previously stored locations. While the device 100 may record a specific latitudinal and longitudinal value for each label, it will be understood that the locational data is subject to error. The device 100 may be configured to determine that any current locational reading that is within 25, 50 or 100 meters (or some other predetermined tolerance value) of a labelled location identified by the stored data is identifiable qualifies as being "at" that particular labelled location, whereas a current locational reading indicating that the device is within 1 kilometer (or some other predetermined value) of the labelled location stored at the device 100 is within the "proximity" of that labelled location.

An event created at the device 100, for example associated with a banner 510 that had been displayed at the device 100, may not always be populated with locational data. If no data concerning a location of an event is provided, the device 100 may be configured to associate the event with a default location identified by the user. That default location typically will be either "home" or "work". In further embodiments, rules may be established at the communication device 100 associating specific entries in an address book at the device 100 with one of these defined locations; for example, all entries in the address book identified as a professional contact of the user (e.g., individuals having work addresses that are the same as the user's work address, or individuals that are explicitly tagged or identified in the address book as "work" contacts) may be automatically associated with the "work" location stored at the device. All entries in the address book identified as a family contact of the user (e.g., individuals having home addresses that are the same as the user's home address, or individuals that are explicitly tagged or identified as "home" contacts) may be automatically associated with the "home" location stored at the device. If an event is created at the device 100 identifying such a "work" contact as a participant or attendee, then the event data may by default be assigned the "work" location, unless express locational data had been provided for the event. Thus, if a default location is assigned to the events created at the device 100, the device may still carry out a method such as that of FIG. 8.

In a still further embodiment, the event management application—whether the calendar application, task application, or some other application—may be configured to invoke other actions based on the user's location with reference to scheduled events. For example, the event may relate to another device or system operated or under the control of the device 100 user, such as a television, personal video recorder, personal computer, home energy management system, or some other device management system. Many devices and systems such as these are now network-enabled or even wirelessly enabled, so that they are capable of being configured or controlled over an Internet connection, which may include a fixed or wireless connection, by the user operating a remote device. An application may be installed and executed on the communication device 100 that allows the user to communicate with a home network installed at the user's residence, or even at another location, that controls one or more devices, such as a personal video recorder (PVR), thermostat, and so forth. The application may allow the user to configure operating conditions or triggers for the device; for example, the user may use the application at the device 100 to program a PVR at the user's home (or at another location) to record a given program. Such an application may also provide program listing browsing and searching capabilities, to allow the user to search for a television program, then use the application to transmit instructions to the PVR to automatically record the television program once found. A home energy management application may be executed on the device 100 to allow the user to control the operation of appliances such as thermostats at the user's home, for example by setting the thermostat temperature for specific times of the day; during warmer months, the user could use the application on the device 100 to program the thermostat to maintain the residence at a temperature of 26C or higher during weekdays, but to turn on an air conditioning unit at 4:30 pm weekdays so that the house is cooled to a comfortable temperature by the time the user returns home from work.

The remote configuration of devices and systems using the communication device 100 may be coupled to the "smart" features described above. As discussed in the context of FIG. 7 above, if the device 100 determines that the user, based on the location of the device 100, will miss an appointment or a task because he or she is too far from the location of the event, then in addition or in place of displaying an alert to the user, the device 100 may be configured to automatically take further actions in respect of events associated with a device or system that is controllable using the device 100. For example, the event stored at the device 100 may be a television program scheduled to run between 8:00 and 9:00 pm that the user wishes to watch. The event may have been generated and stored on the device in accordance with the methods described with respect to FIGS. 5A through 5B and 6A through 6C. Thus, for example, the ancillary data provided to the device for creating the event, which may be stored as a calendar appointment, might comprise:

```
<banner:EventStartDate>2010-02-05T20:00-5.00</banner:EventStartDate>
<banner:EventEndDate>2010-02-05T21:00-5.00</banner:EventEndDate>
<banner:ReminderTime>0.15</banner:ReminderTime>
<banner:EventReference>2682947</banner:EventReference>
<banner:EventType>calendar</banner:EventType>
<banner:EventLocation></banner:EventLocation>
<banner:EventName>The Patent Office</banner:EventName>
<banner:EventDescription>(Comedy, 2010) S. Carell, R. Wilson. The staff
spends the entire episode recalculating patent term
adjustments.</banner:EventDescription>
```

Instead of including a location for the event (as identified by EventLocation), the ancillary data may omit this field and provide only an event reference number (EventReference), which may reference data concerning the event at an external location. This reference number may be used by a PVR or electronic program guide service to identify an airing of a specific program at a specific time. Use of a reference number avoids the requirement to identify a specific channel, since the channel identifier may vary according to the service to which the user subscribes. In another embodiment, the ancillary data may include such a channel identifier.

Since in this embodiment there is no location defined for the event, the device 100 may insert a default location identifier such as "home" for the event location. Alternatively, a rule may be defined on the device 100 so that any events with an event reference value as provided in the example above, or with ancillary data including a channel identifier, are given a default location identifier of "home". In a further alternative, the ancillary information may define a different event type, such as "program"; the rule may then assign the "home" location identifier to the event. The user may, of course, edit the event data to designate a different location for the event, for example if the user is travelling out of town. The assignment of a location to the event is particularly useful since the device 100 may adjust the event time to reflect the time zone that the device 100 is currently in.

If, as described above with reference to FIG. 8, the device 100 determines that an estimated travel time from the device's current location to the "home" location exceeds the difference between the event start time and the current time, the device 100 may issue an alert for the user as described at step 820; however, the device 100 may also be configured to automatically initiate a command to program a PVR at the user's home to record the television program. The command may be transmitted over the network to an external, third-party service to which the user subscribes; from there, the third party service may transmit instructions to the user's PVR. Thus, the user is not required to take an additional step to respond to a reminder or alert at the communication device 100 concerning the upcoming event in order to program the PVR to record the program that the user may miss.

Alternatively, the device 100 may not transmit a command over the network to arrange for programming of the PVR so far in advance of the actual event. Rather, shortly before the scheduled start of the event, the device 100 may contact a location service to determine the current geographic location of the device 100. If the device 100 determines at that time it is not located within the proximity of the event location, then at that point the device 100 may initiate the command to instruct the PVR to record the program. This may take place immediately prior to the commencement of the event; however, to ensure that instructions are received by the PVR in time, the device 100 may determine its location and initiate the command if necessary at least about 15 minutes prior to the commencement of the event.

The foregoing solution may be applied to other systems or devices that are remotely controllable as well. As described above, a home energy management program may be configured to turn on an air conditioning unit (for example, by setting the thermostat to a lower temperature) at a specific time before the user is expected to return home. At that time, the device 100 may contact the location service to determine its current location. Again, if the device determines that the estimated travel time from the device's current location to the "home" location exceeds the difference between the event start time (the setting of the lower temperature and/or engagement of the air conditioning unit) and the current time, the device 100 may initiate a command to be transmitted to the thermostat to delay the start time of the event, for example by delaying it by an appropriate amount to reflect the user's estimated time of return. Like the PVR example above, the device 100 may transmit a command to a third-party service, which then relays a command to the thermostat over the network. Thus, the process depicted in FIG. 8 may be generally followed, although the reminder or alert at 820 may be optional, and the device 10 initiates a command at step 830.

If the event is one that is accessible to the user even when the user is not at the default location—such as a television program, which may be viewable when the user is away from home—the device 100 may be configured to update scheduled events stored in its memory to reflect the user's current location. For example, if the device 100 determines that it is located in a different time zone and that the estimated travel time back to an event location will result in the user missing the event, the device 100 may determine whether the event can be rescheduled for the user's current time zone or location. Even if the user travels to a different time zone, the television program that may be the subject of the calendar event may still be available, although at a different time. Thus, when the device 100 obtains current location information about its position, it may verify its time zone and whether the current time zone has changed from the time zone in which upcoming calendar events, tasks, or other timed events have been scheduled. The upcoming events reviewed may be only those scheduled for the next eight, twelve or twenty-four hours, since the user may manage to return to the original time zone in the near future. The device 100 may then attempt to update the events to reflect the changed time zone. If an event includes an external event reference number, the device 100 may transmit a query to an external service associated with the event, such as an electronic programming guide service, to obtain updated information concerning the event. The external service may respond new or updated information so that the device 100 can change the scheduled time of the event stored in its memory.

Figure 9:
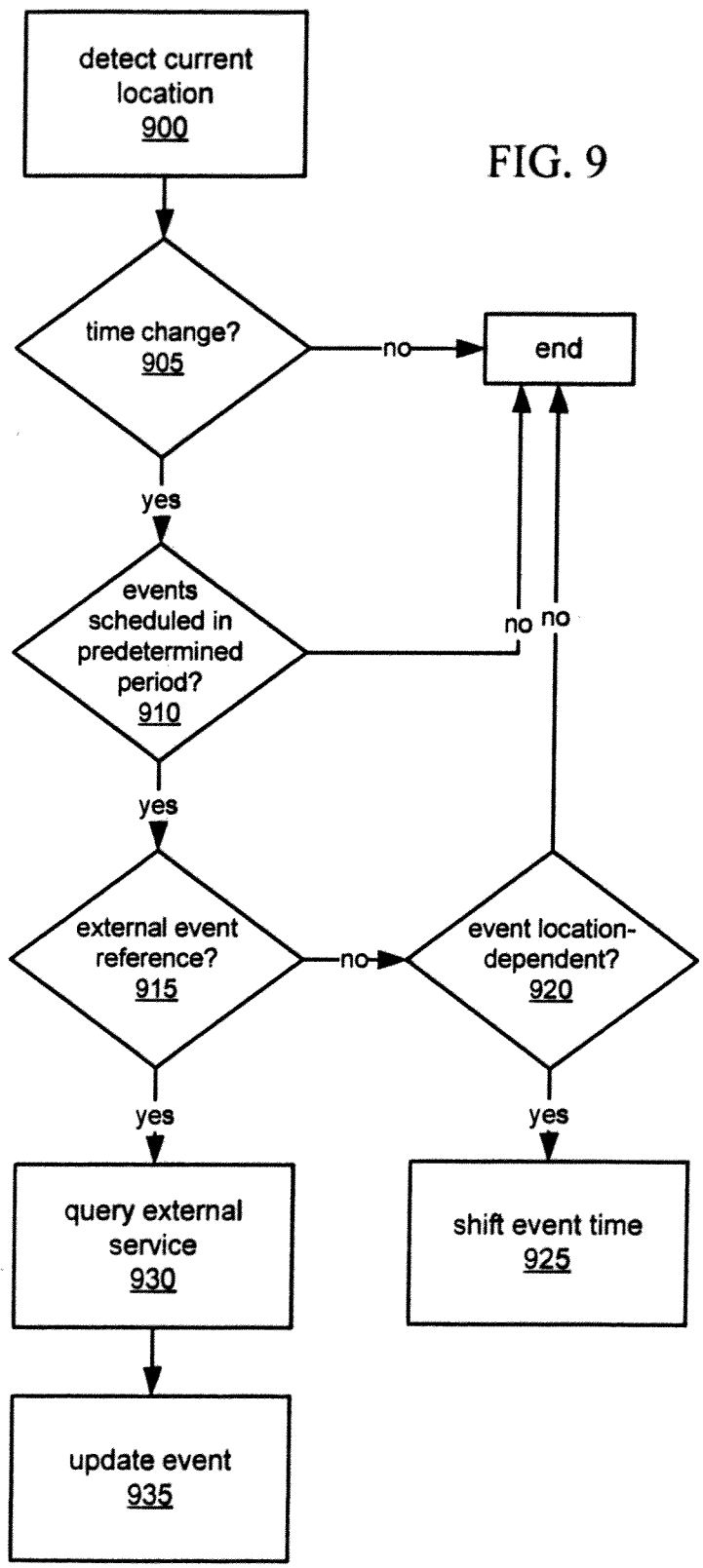
FIG. 9 is a flowchart depicting a method for updating events stored at the mobile device when the device is moved to a new time zone.

This process is illustrated in FIG. 9. At 900, the device 100 obtains its current location from a geolocation service. From the data thus obtained, the device 100 then determines at 905 whether there is a time change resulting from the device 100 being located in a different time zone than the last time its current time was verified against a network. If there has not been a change, this process ends; however, it may be noted that the method of FIG. 8 may continue from step 805. If there has been such a change, the device 100 then queries its data stores at 910 for events, such as calendar appointments, tasks, and other time-based events in the next pre-determined time period (for example, eight, twelve, or twenty-four hours) that were set in accordance with a previous time zone. If there are no such events, the process ends; but if there are such events, the device 100 then attempts to update each such event.

First, the device 100 may determine whether the event comprises an external event reference, indicating that information about the event may be obtained from an external service, at 915. If there is no external event reference, then the device 100 may or may not update the time set for that event. For each event without an external reference, the device 100 may determine at 920 whether there is location information associated with the event indicating that the time was scheduled with reference to a location in a different time zone; i.e., whether the time is location-dependent. For example, if an event on the device 100 was stored in association with the "home" location, the time of that event may be fixed according to the "home" time zone; since the device 100 is now in a new time zone, the device 100 may then shift the event starting and ending times to reflect the same time, in the new time zone, at 925. Thus, if this "home" event was scheduled to begin at 5:00 pm, it may be revised by the device to begin at 4:00 pm if the device 100 had been moved forward by one time zone. If the event is not associated with a location in a different time zone, then the device 100 does not revise the time of the event.

If there is an external event reference, then the device 100 may initiate a query to an external service associated with the reference to obtain updated information at 930. The device 100 may then update the event based on information received in response to the query at 935, including updating the time of the event if required.

The "smart" features may also operate in conjunction with the address book, and not merely time-based events. When the device 100 obtains updated information about its current location, the device 100 may check for updates from select contacts listed in the address book at the device 100 that are determined to be proximate to the device's current location. The update may be obtained by accessing a resource identified by a URI stored in the address book associated with that address book entry; the device 100 may automatically transmit a query to that URI over the network, and receive any updates to the address book entry, and optionally additional ancillary data concerning special offers. The response to the device's query may comprise, for example, ancillary data describing an event, such as a time-limited offer, which may then be automatically stored as a calendar event by the device 100, with a reminder or alert issued to the user. Thus, as the user is travelling with his or her communication device 100 in the proximity of a contact business, the device 100 may issue an alert for user regarding a special offer from that business. The device 100 may also estimate its future position or route based on geographic location information; for example, the device 100 may initiate a query to a mapping service for information about places identified in its address book that are proximate to the device's current route. The current route may be estimated by repeated geographical location measurements correlated to their respective times of measurement; for example, based on such data, it may be determined that the device is travelling along a particular road. The device 100 may then query the address book for all contacts having an address on that road, and then request updates for each of those contacts, then issue notifications to the user accordingly. In order to limit the number of alerts issued to the user via the communication device 100, the device 100 may be configured so that the user may explicitly indicate for which contacts he or she wishes to receive such alerts. For example, in the address book application, the user may be able to edit an individual address book entry to check or uncheck an option to receive alerts concerning that contact.

The device 100 and banners 510 may also be configured to allow the user to participate in a social network. Social networking services are generally known in the art; in addition to allowing subscribing users to share varying levels of personal information about themselves, many social networking services allow the user to express their opinions or preferences for goods or services, either by posting a user-composed message to the service, posting a hyperlink to a product's website to the service, or adding information to the service's database to indicate that the user has purchased that product. The user's messages and activities may be made visible to the general public, only to other subscribers to the service, or only to those subscribers who are identified by the user as "friends".

In this further embodiment, the address book application on the device 100 may be configured to allow the user to add a further attribute to each address book entry to indicate whether the contact is a "friend", "family", "business associate", "supplier", "customer", or other such category of contact. The user may be able to define his or her own labels for contacts, or choose from a predefined set of labels such as the foregoing. Generally, the user may correlate these different categories of contacts with different levels of intimacy; the user may be willing to share deeply personal details with "friends", some personal details with "family", only work-related details with "business associates", and barely any information, if anything, with "suppliers" or "customers". In other words, the various categories of contacts that a user may have falls on a spectrum of intimacy, where at one extreme the user is willing to share any information that he or she might happen to post to a social networking service, and at the other the user is unwilling to share any information at all, except for perhaps a work-related contact address and a professional curriculum vitae. As a corollary, a user may only be willing to hear or read about the personal details of those considered to be "friends" or "family", and less interested to hear personal information from "business associates" or "suppliers". Thus, various categories of contacts may also fall on a spectrum of interest, where at one extreme the user is willing to receive any information about the contact that the contact is willing to share, and at the other extreme the user may not wish to receive any information at all.

Figures 5C, 5D:
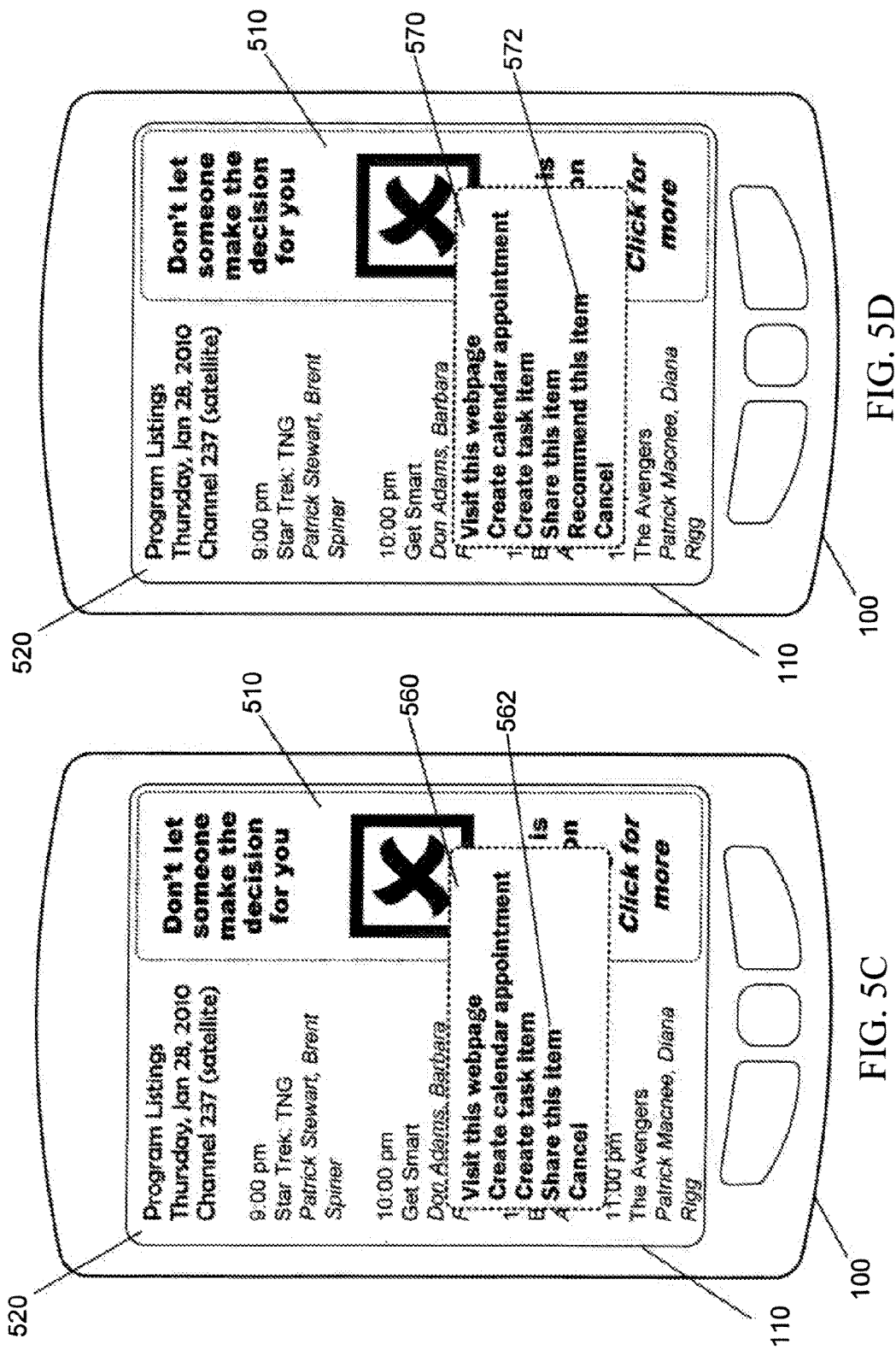

The user of the communication device 100 may invoke a further action with a banner 510 to convey information or endorsements of the subject matter of the banner 510 to at least a subset of the user's contacts, as identified in the address book, using either a social networking service or a messaging service. As shown in FIG. 5C, an instruction may be received at the device to invoke a context menu 560 associated with the banner 510, for example by user actuation of the banner 510. The context menu 560 may include the option to "share" information relating to the banner 510 with others. In a first embodiment, a single sharing option may be provided; at a subsequent step, the user may select the social networking or messaging medium to be used to share the information, and optionally customize a message; or, the context menu 560 may list available social networks, for example those to which the user is already subscribed, or for which a separate application has been installed on the device. The context menu 560 shown in FIG. 5C illustrates the former option at 562. When the device detects an instruction selecting this option to "share" the information, the device 100 may extract or download ancillary information relating to the banner 510 as described above. Then, the device 100 may invoke a further application to permit the user to edit a post to a social networking service. The device 100, upon launching the social networking application, may automatically populate a field of the post to be edited by the user with a URI or other data extracted from the banner 510's ancillary data. The URI may be used by a recipient or reader to view the banner 510 itself, or to view a resource such as a webpage containing further information. The user may then edit the content of the post to add a content if desired. Alternatively, the device 100 may invoke a messaging application to permit the user to edit and send a message, such as an e-mail, SMS, or an instant message. The device 100, upon launching the messaging application, may automatically populate a message body field with the URI or other data extracted from the banner 510's ancillary data. Again, the user may then edit the message prior to transmission.

The recipients or readers of such a post, if the post is transmitted to a social networking service, are typically defined using configuration features provided by the social networking service; for example, the service may have privacy settings that determine who has access to read the user's posts. If the message is transmitted as an e-mail, SMS, or instant message, the user may identify the recipients of the message when the message is edited. The device 100 may also be configured to address the message to a default set of recipients, based on the contact categories defined by the user in the address book; for example, the message may only be sent to "friends" and "family". The default set of recipients may also be edited by the user prior to sending.

In still a further embodiment, the user may submit a recommendation of the banner 510. An example of a context menu that may be invoked on the device 100 is shown in FIG. 5D. The context menu 570 includes a "recommend this item" option 572, which the user may select to submit the recommendation. When this option is selected, the device 100 may construct and transmit a message to a service, for example the service that provided the banner 510 to the device, with the user's identifying information. Optionally, the user may also be provided with the opportunity to submit a comment or review of the subject matter of the banner 510 as well. The service would store the user's identifying information in association with the banner 510, and thus maintain a record of the user's interest in the banner 510 and/or the associated goods, services, or informational message that is the subject matter of the banner 510. Transmitting a message to the service may require prior subscription by the user to the service providing the banner 510; this service may be a social networking service. When another subscriber of the service views the same banner 510, the banner 510 may be displayed on the other subscriber's communication device 100 together with a recommendation message 580, as shown in FIG. 5E, indicating that he first user recommends the banner 510.

Who sees the recommendation message 580 submitted by the first user may be defined by the user's contact categories, as discussed above. For example, an option may be configured at the communication device 100 that only "friends" will be permitted to view the recommendations the user submits to the service. This option, if it is configured at the communication device 100, may be transmitted to the service together with the recommendation message. Alternatively, the user may log into the service directly and define that the recommendation is only to be viewable by those contacts belonging to the "friends" category on the service. In a further alternative, the address book on the communication device 100 may be synchronized with an address book maintained by the service on the user's behalf, so that the user need not assign categories to contacts both on the device 100 and the service. Instead, the user need only assign categories in one place, and those categories will be synchronized with the other location. Or, the device 100 may be configured to only synchronize "friends" contacts with the service. In this manner, the user can define which subset of contacts on the spectrum of intimacy are able to see the user's recommendation messages 580.

Whether the user of the communication device 100 sees a recommendation 580 from another user may also depend on whether the user has expressed an interest in seeing the recommendations of that other user. In other words, the user may define whose recommendations he or she sees based on the recommender's position on the spectrum of interest defined by the user. The user may only be interested in seeing the recommendations of "friends" and "family", but no one else. This option may be configured at the device 100, but then may be transmitted to the service for recording against the user's preferences. In future, when the service identifies and prepares a banner 510 for transmission to the user's device, the service may determine whether any contact of the user's has provided a recommendation and/or comment about the banner 510, and whether the user's options permit the recommendation to be displayed on the user's device 100. If both conditions are satisfied, the recommendation 580 may be transmitted to the device 100 at the same time, or approximately the same time, as the banner 510.

The user making the recommendation may be given the option to include a review or comment on the banner 510. In the example of FIGS. 5E and 5F, initially only the recommender's identity may be displayed in the recommendation message 580. Invoking an instruction relating to the message 580, for example by clicking on or otherwise actuating the message, may bring up a further view, shown in FIG. 5F, in which the comment or review submitted by that user may be viewed, as shown in box 592. Optionally, the comments or reviews of other recommenders may also be displayed at the same time, as shown by box 594. Not every recommender may be identified in a recommendation message 580, as a large number of recommenders may unduly obscure the view of the banner 510. The recommendation and the review or comment may be delivered to the device 100 at the same time or approximately the same time as the banner 510. The recommendation, and optionally the review or comment, may even be embedded within the file comprising the banner 510 itself, or in an envelope wrapping the banner 510 file.

Figure 10A:
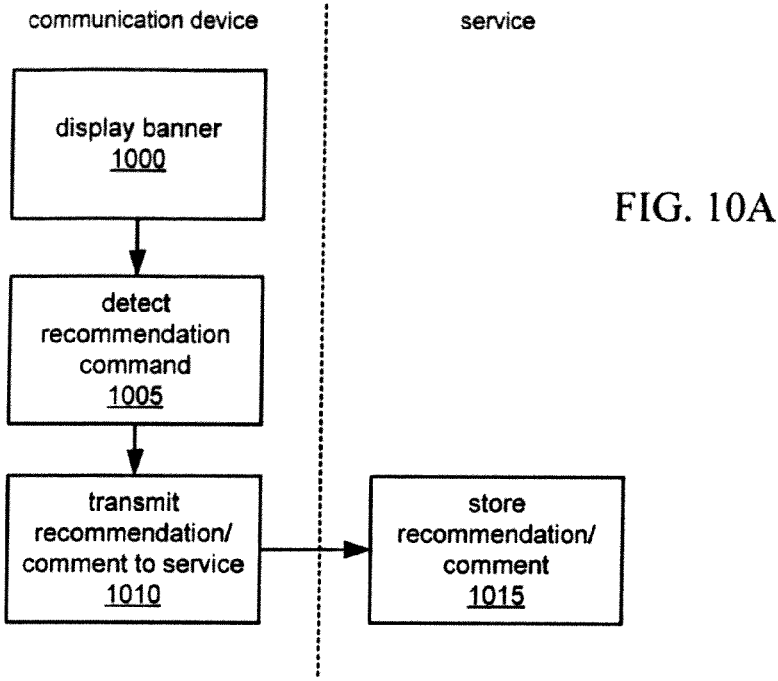
FIGS. 10A and 10B are flowcharts illustrating methods for handling and distributing recommendations.
Figure 10B:
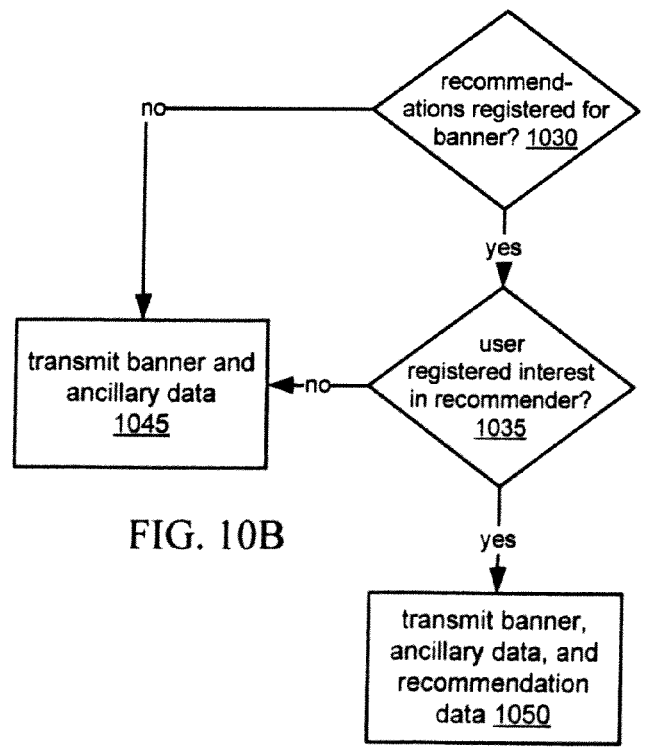

A method for implementing this process is shown in FIGS. 10A and 10B. Turning first to FIG. 10A, at 1000, a first banner 510 is displayed to the user at the communication device 100. The user decides to recommend this banner 510, and invokes a command to indicate that the user recommends the banner 510, detected at 1005. Optionally at this step, the user is given the opportunity to enter a comment or review to accompany the recommendation. At 1010, the recommendation and the optional comment or review is transmitted to the service for storage. At 1015, the service stores the recommendation in association with the banner 510 and the user. At any time during this process, the user may define the set of recipients or other users of the service that are permitted to view the recommendation and optional comment.

Referring now to FIG. 10B, after a recommendation has been registered by the service against a banner 510, the next time that banner 510 is served to a user, the service first determines whether any recommendations have been registered in respect of the banner at 1030. If there are no recommendations, the service transmits the banner 510 and any ancillary data, as explained previously, to the user's device at 1045; the ancillary data will not include any recommendation data. If there are recommendations, at 1035 the service compares the recommenders against the list of subscribers from whom the user is willing to receive recommendations, i.e. those whom the user has identified as having an interest. If there are no recommenders from whom the user is willing to receive recommendations, then again the process moves to 1045. If there are such recommenders, however, then the service prepares to send recommendation data to the device 100 as well as the banner 510 at 1050. The service may accomplish this by embedding recommendation data relating to those recommenders that the user is interested in into the file comprising the banner 510 or the ancillary data, or alternatively by constructing a separate file containing the recommendation data for transmission to the device at 1040.

The systems and methods disclosed herein are presented only by way of example and are not meant to limit the scope of the application. Other variations of the systems and methods described above will be apparent to those in the art and as such are considered to be within the scope of the application.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method, comprising:
a communication device obtaining its current geographical location over a network;
the communication device obtaining, over the network, an estimated travel time for travel between the current geographical location and a location associated with an event stored at the communication device;
if the estimated travel time is greater than the difference between a start time of the event and a current time, the communication device transmitting an instruction over a network to a service for automatically controlling an external device, such that the external device is configured to carry out an action at the start time of the event.

2. The method of claim 1, wherein the external device is a personal video recorder, the event is a broadcast program, and the action is recording the program.

3. A communication device, comprising:
a processor configured to obtain, over a network, a current geographical location of the communication device and an estimated time for travel between the current geographical location and a location associated with an event stored in a memory of the communication device;
wherein the processor is configured to transmit an instruction over the network to a service for automatically controlling an external device if the estimated time is greater than the difference between a start time of the event and a current time such that the external device is configured to carry out an action at the start time of the event.

4. The communication device of claim 3, wherein the external device is a personal video recorder, the event is a broadcast program, and the action is recording the program.

* * * * *